July 14, 1970          K. S. LION          3,520,609
METHOD AND APPARATUS FOR DETECTING AGGLUTINATION REACTIONS
Filed April 12, 1968          3 Sheets-Sheet 1
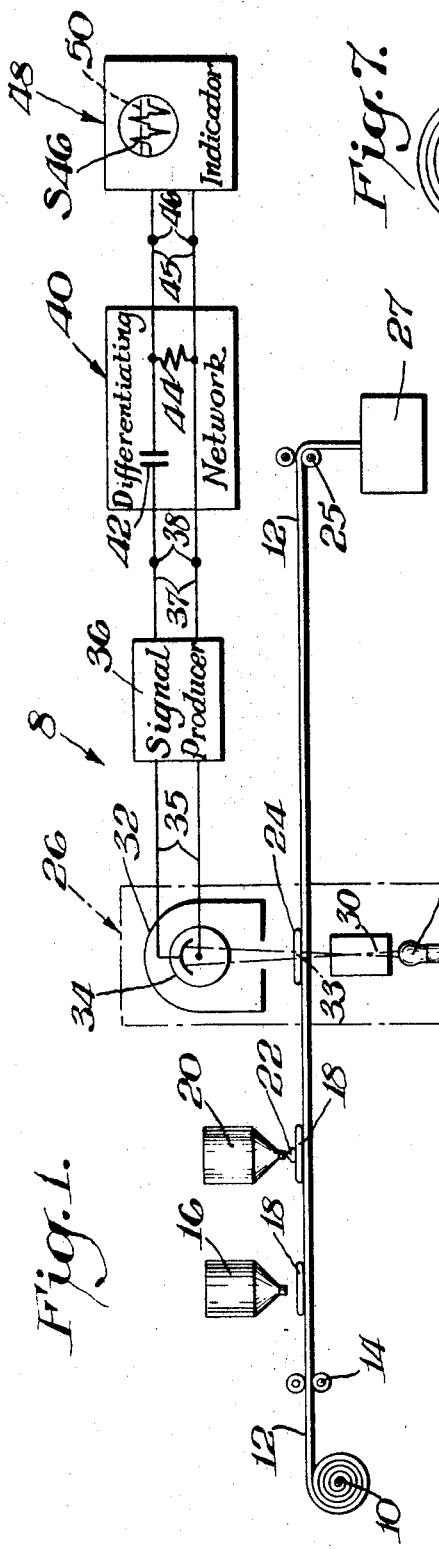
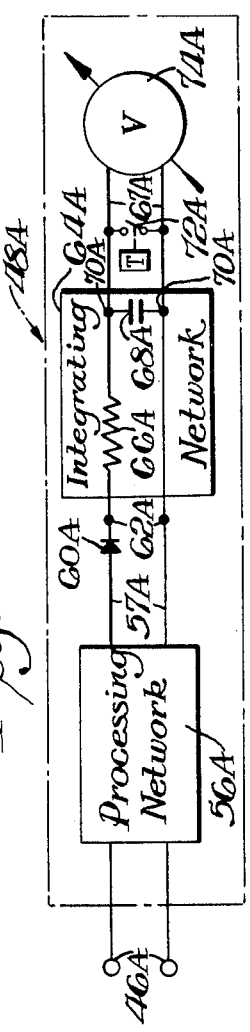
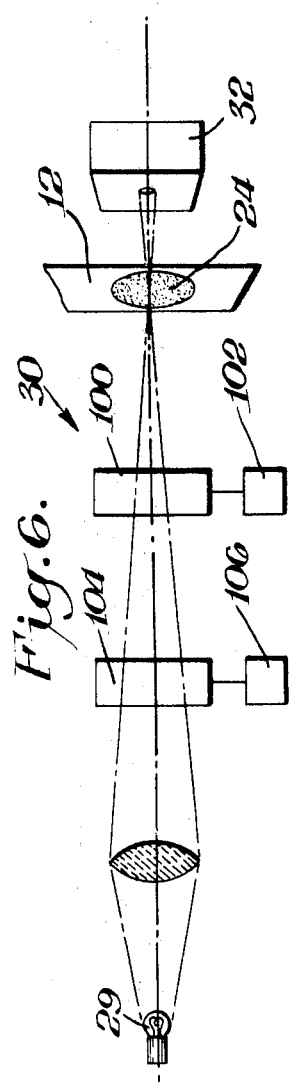
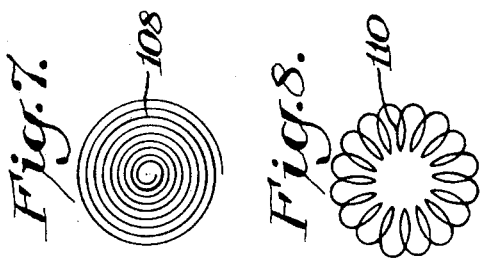
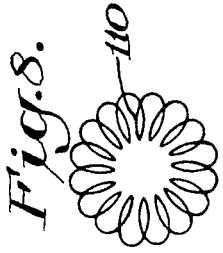

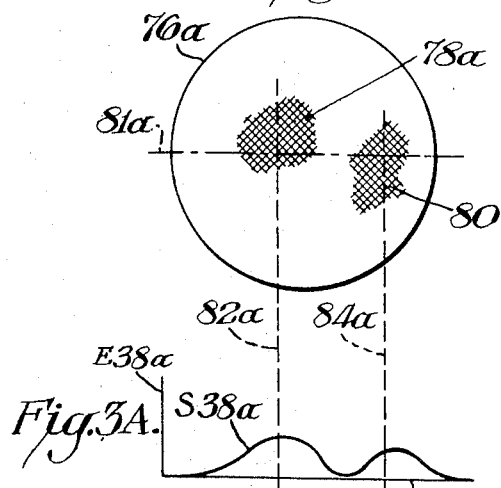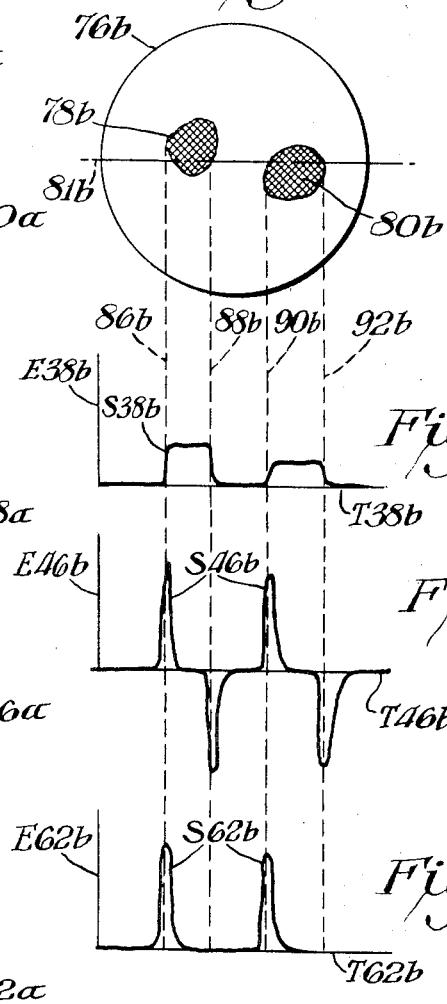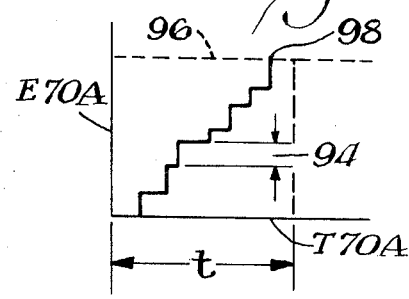

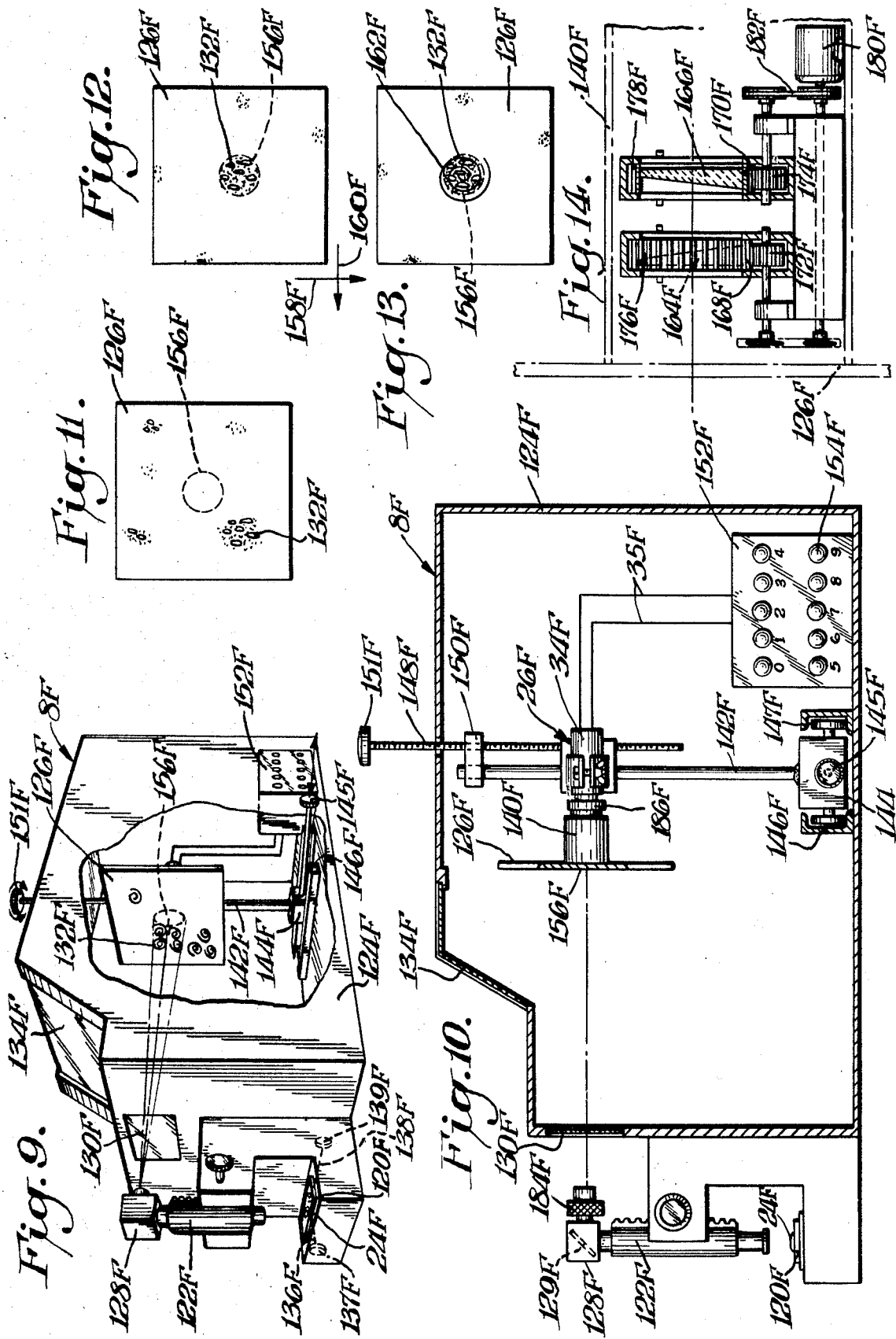

United States Patent Office 3,520,609
Patented July 14, 1970

3,520,609
METHOD AND APPARATUS FOR DETECTING AGGLUTINATION REACTIONS
Kurt S. Lion, Belmont, Mass., assignor to Chas. Pfizer & Co., Inc., New York, N.Y., a corporation of Delaware
Continuation-in-part of application Ser. No. 566,937, July 21, 1966. This application Apr. 12, 1968, Ser. No. 720,911
Int. Cl. G01n *33/16, 21/00, 71/00*
U.S. Cl. 356—39     11 Claims

ABSTRACT OF THE DISCLOSURE

A specimen is scanned with a beam of energy, which is modulated by differences in the absorption of the beam within the reaction zone to produce a first signal. The first signal is differentiated to derive a second signal corresponding to the rate of change of the first. The second signal is integrated during a predetermined period of time and compared with a predetermined standard corresponding to substantial agglutination to determine if such is present in the reaction zone. The comparison is visually determined by a voltmeter or oscilloscope or electrically by a number displaying tube array or trigger circuit. The detecting apparatus is stationary with the specimens being moved relative to it, or the specimen is stationary and scanned by a moving beam. The specimen is directly or indirectly micro or macroscopically scanned. A semi-automatic apparatus projects a magnified image obtained from a microscope on a screen, which is manipulated by an operator to place the most significant portion over a scanning section.

CROSS REFERENCE TO RELATED APPLICATION

This application is a continuation-in-part of pending application Ser. No. 566,937, filed July 21, 1966, now abandoned; and application Ser. No. 670,294, filed Sept. 25, 1967 by the same inventor.

BACKGROUND OF THE INVENTION

This invention relates to the automatic detection of clumping or agglutination reactions and it more particularly relates to the detection of agglutination reactions in blood specimens.

Agglutination or clumping reaction tests are commonly conducted in the laboratory for blood testing and typing. These tests are conventionally conducted by hand on a microscopic slide or in a test tube. A suitable reagent is mixed with the biological fluid specimen, such as blood, to be typed or tested. After the required reaction time elapses, the sample is visually inspected and compared with a standard specimen to determine whether substantial clumping or agglutination has occurred. This procedure is slow and subjective. It is therefore highly prone to human inconsistency and error. Various electronic devices have been proposed for analyzing biological specimens, such as in blood cell counting. They cannot, however, be used for detecting agglutination reactions because they are basically particle counters, and mere particle count is not indicative of completion of agglutination or clumping of cells. Typical electronic particle counters are described in U.S. Pats. Nos. 2,494,441, 2,570,442, 2,731,202, 2,847,162, 2,927,219 and 2,948,470.

An object of this invention is to provide a reliable automatic method and apparatus for detecting agglutination reactions.

SUMMARY OF THE INVENTION

In accordance with this invention, small substantially circular samples of specimen and reactant are scanned by a beam of energy. The beam, such as light or electron, is modulated by differences in its absorption within the circular reaction area. Substantial agglutination or clumping establishes significant demarcations in the scanned zone between the clumped cells and the surrounding area. These demarcations significantly modulate the scanning beam as it crosses them thereby causing a considerable rate of change in the signal thereby produced. A second signal is derived in accordance with the rate of change of the beam generated signal. The derived signal is therefore indicative of the aggregate of demarcations and progress of the agglutination reaction in the scanned zone. The second signal is integrated during a predetermined period of time, and the integrated total value is compared with a predetermined standard, corresponding to the presence of substantial agglutination to determine whether such has occurred in the reaction area.

The rate of change of the generated signal may be conveniently determined by a differentiating network whose output is analyzed by indicating means such as a peak voltmeter, oscilloscope, oscillograph, trigger circuit or integrating network that adds up signals received from the differentiating network to determine the presence of agglutinaiton. The operating parameters or minimum trigger threshold for the differentiating circuit may be adjustable to detect different types or stages of agglutination reaction.

The detecting beam or the specimens may move relative to each other. The specimens may be micro or macroscopically scanned and a semi-automatic apparatus projects a magnified image on a screen which is manipulated to place the most significant area upon a relatively small section which is scanned. The scanning pattern may be linear or curved, such as spiral or rosette.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which:

FIG. 1 is a schematic diagram of one embodiment of this invention;

FIG. 2 is a detailed schematic diagram of one form of indicating portion for the embodiment shown in FIG. 1;

FIG. 3 is a plan view of a sample of unagglutinated specimen and reagent;

FIG. 3A is a graph of voltage vs. time for the signal appearing at a part of the FIG. 1 schematic diagram as a result of scanning the FIG. 3 sample;

FIG. 3B is another graph of voltage vs. time for the signal appearing at another part of the FIG. 1 schematic diagram as a result of scanning the FIG. 3 sample;

FIG. 3C is a further graph of voltage vs. time for the signal appearing at a further part of the FIG. 1 schematic diagram as a result of scanning the FIG. 3 sample;

FIG. 4 is a plan view of a sample of agglutinated specimen and reagent;

FIG. 4A is a graph of voltage vs. time for the signal appearing at a part of the FIG. 1 schematic diagram as a result of scanning the FIG. 4 sample;

FIG. 4B is another graph of voltage vs. time for the signal appearing at another part of the FIG. 1 schematic diagram as a result of scanning the FIG. 4 sample;

FIG. 4C is a further graph of voltage vs. time for the signal appearing at a further part of the FIG. 1 schematic diagram as a result of scanning the FIG. 4 sample;

FIG. 5 is a graph of voltage vs. time for the indicating signal developed in the integrating circuit shown in FIG. 2;

FIG. 6 is a schematic diagram of a rotating optical system for scanning a sample of specimen and reactant;

FIG. 7 illustrates a spiral scanning pattern;

FIG. 8 shows a rosette-type scanning pattern;

FIG. 9 is a three-dimensional view partially broken away of a semi-automatic projection type apparatus, which is another embodiment of the invention;

FIG. 10 is a cross-sectional side view in elevation of the apparatus shown in FIG. 9;

FIG. 11 is a front view in elevation of the viewing screen of the embodiment shown in FIGS. 9 and 10;

FIG. 12 is a front view in elevation of the screen shown in FIG. 11 in another position;

FIG. 13 is another front view in elevation of the screen of FIG. 12 with a spiral scanning pattern superimposed upon it; and FIG. 14 is a cross-sectional view in elevation of the spiral scanning component shown in FIG. 10.

DETAILED DESCRIPTION OF THE INVENTION

In FIG. 1 is shown an apparatus or instrument 8 for automatically detecting agglutination in the reaction zone of automatically prepared samples 24. Samples 24 may also be manually prepared and physically manipulated by any suitable means within the context of this invention.

In apparatus 8 shown in FIG. 1, samples 24 are conveyed upon foil 12 made of a tough flexible light-transparent material such as polyethylene. Foil 12 is unrolled from supply reel 10 by motor driven feed rollers 14. A puddle of reactant 18 is first deposited on foil 12 from dispenser 16, and a spot of biological specimen 22 such as blood is dropped into reactant 18 from dispenser 20. The substantially circular sample puddle 24 thus produced then moves into the scanning stage of energy beam scanning means 26 after sufficient time has elasped for the agglutination reaction if any to proceed within it. It is conveyed from scanner 26 on foil 12 by end drive rollers 25 and finally into disposal container 27.

Energy beam scanning means is shown as a visible light microscope type, but it can be any suitable type of such means including an electron beam scanning means incorporating an electron microscope or kinescope. Scanning means 26 includes a light source 29, a rotary optical system 30 and a photoelectric cell or phototube 34. Photoelectric cell or phototube 34, which may be of the photomultiplier type, is mounted within housing 32 for receiving the portion of the beam transmitted through the scanned reaction zone of sample 24. The response of scanner 26 corresponds to the differences in absorption of its beam represented by cone 33 in the reaction zone. The cross section of the scanning beam is relatively small in comparison to agglutination regions to make its response more precise. The differences in absorption may be detected by measurement of any representative function such as transmission, reflectance, etc.

The response of energy beam scanner 26 is channeled to signal producer 36 through electrical leads 35. Signal producer 35 includes suitable components for generating an electrical signal corresponding to the modulation of the scanning beam by the differences in its absorption in the reaction zone as detected by phototube 34. Signal producer 36 may include a power supply for the photoelectric cell or phototube 34, suitable load resistors, amplifiers and power supplies therefor.

Signal producer 36 generates a first signal which is connected through leads 37 and terminals 38 to differentiating network 40 including capacitor 42 and resistor 44. Differentiating network 40 derives a second signal corresponding to the rate of change of the first signal received from signal producer 36. This second signal is indicative of the sharpness of demarcation between different areas in sample 24 and the aggregate of agglutination in the scanned reaction zone. This derived signal is connected to indicating means 48 through leads 45 and terminals 46. Indicating means 48 is later described in detail in FIG. 2 in the form of indicating portion 48A. Indicating means 48 includes a peak voltmeter or an oscilloscope which provides a visual indication of the magnitude of the derived second signal for comparison with a predetermined standard 50 that is representative of the scanned response to substantial agglutination. Indicating means 48 may instead include a trigger circuit which electrically indicates and compares with a predetermined standard corresponding to substantial agglutination.

In FIG. 2 is shown an advantageous form 48A of the indicating portion 48 of instrument 8 shown in FIG. 1. Indicating means 48A includes a processing network 56A incorporating components such as amplifiers, trigger networks, fly-backs circuits and free-running multivibrators for processing the signal from differentiating network 40 for comparison with the predetermined agglutination standard. Indicating means 48A is of the timed integrating type and it therefore includes integrating network 64A and time switch 72A later described in detail.

Integrating network 64A is connected to processing circuit 56A by leads 57A through terminals 62A. Diode rectifier 60A is connected between processing circuit 56A and integrating network 64A to provide monodirectional signals to integrating network 64A that can be integrated or summed within it. Integrating network 64A includes resistor 66A and capacitor 68A connected between terminals 70A. The integrated output from integrating network 64A is connected by leads 67A to exhibiting means 74A which is an electronic voltmeter of the type requiring negligible operating current to conserve the charge accumulated in capacitor 68A.

As previously mentioned, processing circuit 56A may include amplifiers to reinforce weak signals and various signal transmission and reinforcing components, such as trigger or fly-back circuits or free-running multivibrators. Time-operated switch 72A connected between voltmeter 74A and capacitor 68A permits the discharge of integrating network 64A to reset it for a succeeding cycle of operation. Switch 72A is timer-operated to cause integrating network 64A to provide an output corresponding to the total value integrated during a predetermined period of time, such as ten seconds.

FIG. 6 shows one form of rotary optical system for deflecting the visible light beam of the agglutination detecting apparatus described above, it being understood that other deflecting arrangements can be used when the energy beam is an electron beam, for example. Advisably, optical system 30 comprises a pair of rotatable lens elements in the path of travel of the energy beam between its source 29 and the support surface 12 upon which the rectant 18 and biological specimen 22 are deposited. Each lens element is connected to a motivating means that operates to rotate each element at a predetermined speed. Lens element 100 may take the form of a Dove or Wollaston prism arranged for continuous rotation by motivating means 102 connected to it. Such prisms rotate the image by an angle twice as large as the angle by which the prism rotates. For example, when the prism rotates 360° or one full turn, an observer located at the sample 24 sees the light source rotate twice.

When light source 29 is located at the axis of symmetry of the optical system, the energy beam from that source upon the sample 24 will remain on the optical axis. As lens element 100 rotates, the beams of energy remains fixed on the sample. However, when the light source is slightly displaced from the axis of symmetry of the optical system, the projected light spot on the sample orbits about the axis and describes a circle. Further movement of the light source away from the optical axis produces larger circles.

As described above, rotary optical system 30 also includes a second rotary lens element 104 in the form of an optical wedge arranged for rotation by motivating means 106. Wedge 104 rotates in the same direction as lens element 100. The rotation of the wedge causes a displacement of the light spot from a position close to the optical axis to a position removed from it. When both lens elements rotate, the scanning pattern at the reaction zone is a spiral 108, as shown in FIG. 7. If the rotational speed of wedge 104 is low compared to that of Dove prism 100, the traces of the spiral are closely spaced. A rotary speed for the wedge of about one-tenth to one-twentieth to that of the Dove prism proves extremely efficient for inspecting a sample for an agglutination reaction.

Pure rotary optical systems have distinct advantages over oscillating systems and combination system comprising both oscillating and rotating lens elements. The non-rotary types frequently cause vibration of the entire optical system as well as instability and noise. Stable oscillating systems are also difficult to produce. Moreover, many advantages are derived by using a pure rotary system that produces a circular scanning pattern at the reaction zone. Since the reaction zone is for the most part circular in configuration, a substantially circular scanning pattern remains entirely in the reaction zone. Rectangular raster scanning techniques have the disadvantage of moving the energy beam out of a circular reaction zone at the extremeties of the scanning lines causing the energy beam to fall outside of the circular reaction area. This is equivalent to an interruption by a dark area caused by agglutination whereby an erroneous signal is produced by the detecting apparatus.

Alternatively, the rotary optical system used in the above described agglutination detecting apparatus can take the form of two optical wedges each of which is caused to rotate in the same direction with one of the wedges moving at a greater rotary speed than the other. Such an arrangement produces a circular scanning pattern in the form of a rosette 110, as illustrated in FIG. 8.

Other modifications of the above described optical systems are also available. For example, point light source can be replaced by collimator systems. Moreover, achromatic wedges can be used instead of simple wedges, and parallel light beams can be used as alternative to convergent and divergent light beams.

The operation of instrument 8 described in FIGS. 1 and 2 is now described in conjunction with FIGS. 3–5. FIGS. 3 and 4 are schematic diagrams of samples similar to sample 24 as they appear under a microscope of moderate magnification. Sample 76a shown in FIG. 3 is unagglutinated and sample 76b shown in FIG. 4 includes agglutination regions. There are several dark reigons 78a and 80a in FIG. 3 caused by inhomogeneities or variations in layer thickness. Such dark regions are not however representative of agglutination because they do not have well-defined borderlines or sharp demarcation from the remaining area of sample 76a. In sample 76b of FIG. 4, in which substantial agglutination exists, the borderlines of regions 78b and 80b are well-defined, thus sharply demarcating them from the surrounding area of sample 76b. Such sharp demarcations cause drastic differences in the response of apparatus 8 as it scans each of the samples and great rates of change in the signal generated by the scanning beam.

FIGS. 3A, 3B and 3C are aligned with sample 76a in FIG. 3 to indicate the signals in corresponding parts of system 8 as a result of scanning samples 76a and 76b. Vertical lines 82a and 84a running through FIGS. 3, 3A, 3B and 3C designate corresponding portions of these figures.

FIG. 3A shows the form of graph of signal S38a at terminal 38 of FIG. 1 provided by signal producer 36 in response to the scanning of its beam along the line 81a shown in FIG. 3. E38a designates the voltage ordinate and T38a the time abscissa. The ordinates and abscissas in graph FIGS. 3A, B, C and 4A, B, C are similarly designated by reference characters including the number of the terminals at which their signals occur. The partial absorption or obliteration of the beam by areas 78a and 80a modulates the beam to provide output signal S38a. Signal S38a has substantial amplitude but only a gentle slope, which is representative of the gradual demarcation between areas 78a and 80a and the rest of sample 76a.

FIG. 4A resulting from the scanning of the sample 76b in FIG. 4 shows a signal S38b whose amplitude is generally the same as S38a in FIG. 3A, but it has a much sharper slope at lines 86b, 88b, 90b and 92b corresponding to the points at which a beam scanning through FIG. 4 along the line 81b crosses the well-defined borderlines of areas 78b and 80b. The slope of signal S38b at these borderlines is relatively steep as a function of time in comparison to signal S38a in FIG. 3A.

The application of signals S38a and S38b to differentiating network 40 in FIG. 1 derives second signals, S46a and b, corresponding to the rates of change of the first signals, which are indicative of the demorcation of areas 78a, 78b and 80a and 80b from the rest of samples 76a and 76b. Signal S46a in FIG. 3B is therefore negligible in comparison to S46b consisting of sharp pulses in FIG. 4B. The magnitude of signals S46a and S46b is therefore indicative of the sharpness of demarcation and aggregate of agglutination in the scanned reaction zone. Signals S46a and S46b are integrated over a predetermined period of time and the resultant output is displayed on an oscilloscope which is part of indicator 48 as shown in FIG. 1 for comparison with a standard line 50 representative of substantial agglutination. Indicator 48 includes the same components of indicating means 48A shown in FIG. 2. When signal S46 rises above standard line 50, even an unskilled operator straightforwardly recognizes that the sample then being scanned is agglutinated.

In the more detailed description of indicating means 48a, described in FIG. 2, signal S46 is transmitted through terminals 46A, processing network 56A, rectifier 60A and terminals 62A to integrating network 64A. Signals S46a and S46b are rectified by diode 60A to change them from bidirectional to the monodirectional signals S62a and S62b shown in FIGS. 3C and 4C. Signals S62a and S62b are then channeled to capacitor 68A of integrating network 64A whose charge, E70A, vs. time, T70A, across terminals 70A is shown in FIG. 5. Each time the scanning beam moves over a substantial demarcation line (such as about areas 78b and 80b) the charge on capacitor 68A (shown on voltmeter 74A in FIG. 2) steps up in increments 94 toward a predetermined standard 96 corresponding to substanial agglutination. If this charge reaches standard level 96 within the predetermined period of time set by timer-operated switch 72A (such as at point 98), the operator is positively informed that substantial agglutination is present. Since the reading of voltmeter 74A can be the result of a number of scans (in a multiline raster) the presence of a single disturbance such as an air bubble does not significantly distort the output reading. Timer-operated switch 72A discharges capacitor 68A, after standard voltage 96 is reached, to reset voltmeter 74A for reading the next sample.

Oscilloscope indicating means 48 in FIG. 1 provides a visual indication of the magnitude of the derived and time-integrated signal for visual comparison with a predetermined standard line 50. Timed integrating network 48A of FIG. 2 provides an electrical comparison between the magnitude of the time-integrated signal with a predetermined standard corresponding to substantial agglutination.

An electrical comparison of the magnitude of the derived second signal with the predetermined standard may also be accomplished by a trigger circuit (not specifically illustrated) but represented by line 96 in FIG. 5. The trigger circuit may be, for example, of the thyratron type described on pp. 193–202 of Electronics in Industry, 3rd ed. George M. Chute, McGraw-Hill Book Company, Copyright 1955, 1956. Discussions of some of the other electronic components mentioned herein are also included in this text.

The trigger circuit suppresses time-integrated signals below the predetermined minimum represented by line 96 and transmits only time-integrated signals reaching it. It therefore both electrically indicates and compares with the predetermined standard, and the output of the trigger circuit may be directly indicated on a chart and/or by an indicating light.

The aforementioned predetermined standard and predetermined minimum standards may be varied by utilizing and adjustable differentiating network 40 including variable elements (not shown). This permits the parameters and response of differentiating network 40 and the operating threshold of the system to be adjusted for indicating different types of stages of the agglutination reaction, to screen out background interference or to select certain degrees of demarcation for detection. A skilled operator may set instrument 8 to detect a certain level of agglutination for a given type of specimen. Once the operating threshold is set, the instrument routinely carries on to uniformly read all samples of that type. The reading of the instrument will be much more uniform and reliable than visual comparison by even the most skilled and experienced operator. It differs significantly from electronic counters used for bacteria or blood cell counting because the operating criterion is the relative sharpness of demarcation of different regions totalled within a given period of time and not only the different amounts of light absorbed by the different regions or absolute level of light intensity.

In FIG. 9 is shown a semi-automatic apparatus 8F for detecting agglutination in the reaction zone of samples 24F, disposed upon the viewing plate 120F of projecting microscope 122F. Microscope 122F is mounted against casing 124F (which provides a base). Within casing 124F is enclosed laterally and vertically adjustable viewing screen 126F. Projecting microscope 122F magnifies and projects an image of specimen 24 through projecting head 128F including reflector 129F into the interior of casing 124F through aperture 130F. Magnified image 122F is projected upon screen 126F to permit an operator (not shown) to inspect it through observation window 134F. Image 132F may be varied by adjusting the lateral position of specimen 24F in two directions by means of traversing devices 136F and 138F, which are actuated by knobs 137F and 139F.

Scanning means 26F is mounted on the other side of screen 126F. Scanner 26F is similar to scanning device 26 in FIG. 1 but is more similar to optical scanning device 30 shown in FIG. 6. It differs from each of them, however, in that it scans a magnified projected image of specimen 24F instead of the specimen itself. Scanning device 26F includes phototube 34F and beam translation device 140F for moving the beam across the image. Beam translating device 140F is later described in detail in conjunction with FIG. 14. Viewing screen 126F is mounted upon vertical post 142F. Post 142F is mounted upon block 144F which is laterally traversed by pulling or pushing on shaft 145F to move block 144F and rollers 147F back and forth on tracks 146F. The vertical position of scanner 134F is adjusted by means of threaded adjusting screw 148F with knob 151F which engages threaded block 150F attached to the top of post 142F. Phototube 34F is mounted in the rear of scanning device 26F and is connected by wires 35F to electronic cabinet 152F, which incorporates networks similar to those shown in FIGS. 1 and 2 with number-indicating output tubes 152F for displaying the extent of agglutination detected by apparatus 8F. Such indicating tubes are referred to as Nixie tubes.

In FIG. 14 is shown an example of beam translating device 140F for moving the scanning beam across the portion of image 132F within scanning section 156F of screen 126F. Scanning device 140F includes a pair of optical wedges 164F and 166F mounted in cylindrical cages 168F and 170F. Cages 168F and 170F are rotated by pinions 172F and 174F engaging circular racks 176F and 178F about the peripheries of cylindrical cages 168F and 170F. Pinions 172F and 174F are driven by synchronous motor 180F and belt and pulley transmission 182F. Rotation of optical wedges 164F and 166F provides spiral scanning pattern 162F shown in FIG. 13, which is similar to that of FIG. 7 and provided in a similar manner. Other patterns and beam translating devices may be utilized.

The sensitivity of instrument 8F may be adjusted by varying the size of the projected image by means of focusing device 184F on projecting microscope 122F or by varying the aperture opening into phototube 134F by variable diaphragm 186F mounted in front of phototube 134F. This may be used to adjust the parameters of instrument 8F such as photocell voltage to maintain sensitivity substantially constant for reading different thresholds of agglutination.

Apparatus 8F is operated in the following manner. Specimen 24F is adjusted under the microscope 122F by movement of viewing plate 120F. This is accomplished by manipulating traversing devices 136F and 138F by rotating adjusting knobs 137F and 139F. The operator (not shown) inspects image 132F through window 134F shown in FIG. 9. If the most significant portion of image 132F is remote from scanning section 156F of screen 126F, the operator manipulates knobs 145F and 151F to move image 132F to the position shown in FIG. 12 resulting from movement of the FIG. 11 screen 126F in the direction of arrows 158F and 160F. This places the most significant portion of image 132F within scanning section 156F of screen 126F. Beam translating means 140F is then operated to provide a scanning pattern, which is, for example, spiral pattern 162F shown in FIG. 13. This scanning pattern is utilized in the manner previously described to detect the degree of agglutination which is read out on one of indicating tubes 154F to indicate a degree of agglutination in the form of an arbitrary number value ranging from "0" to "9."

What is claimed is:

1. A method for detecting agglutination in a reaction zone by scanning it with a beam of energy which comprises the steps of scanning a sample in a reaction zone with a beam of energy producing a first signal in response to the modulation of said beam of energy by differences in its absorption within said reaction zone, deriving a second signal corresponding to the rate of change of said first signal, said second signal being indicative of the aggregate of agglutination in said reaction zone, integrating said second signal during a predetermined period of time, and comparing the timed integrated second signal with a predetermined standard corresponding to substantial agglutination to determine whether such substantial agglutination is present in said reaction zone.

2. A method as set forth in claim 1 comprising transmitting timed integrated second signals above a predetermined minimum for indicating the presence of substantial agglutination and suppressing timed integrated second signals below said predetermined minimum.

3. An apparatus for determining whether agglutination is present in a reaction zone comprising energy beam scanning means arranged for inspecting said reaction area whereby said beam is modulated in accordance with the differences in absorption of said beam in said reaction zone, a signal producer connected to said energy beam-scanning means for producing a first signal corresponding to said modulation of said energy beam scanning means, differentiating means connected to said signal producer for deriving a second signal from said first signal corresponding to the rate of change of said first signal whereby the aggregate of agglutination in said scanned reaction zone is indicated, integrating means connected to said differentiating means for totalling the magnitude of said second signal, timing means connected to said integrating means whereby the total magnitude of said second signal over a predetermined period of time is obtained, standard means capable of detecting a magnitude of timed integrated second signal corresponding to substantial agglutination projecting means for projecting a magnified image of said reaction zone, said projecting means including a viewing screen upon which said image is projected, said viewing screen including a scanning section, and translating means connected to said viewing screen for varying its position relative to said image to dispose the most significant portion of said image over said scanning section.

4. A method as set forth in claim 1 comprising projecting a magnified image of the reaction zone and shifting and the relative position of said magnified image and said beam of energy to cause said beam of energy to scan the most significant portion of said magnified image.

5. A method as set forth in claim 1 wherein said step of scanning comprises deflecting the energy beam into a spiral scanning pattern at the reaction zone.

6. A method as set forth in claim 5 wherein the step of deflecting comprises rotating a pair of lens elements in the path of the beam of energy between its source and the reaction zone.

7. An apparatus as set forth in claim 3 wherein said projecting means comprises a projecting microscope.

8. An apparatus as set forth in claim 7 wherein said viewing means is mounted upon translating means capable of adjusting its position in two directions.

9. An apparatus as set forth in claim 8 wherein said projecting microscope and viewing screen are mounted upon a base, and said base being constructed and arranged to permit an operator to visually inspect the image projected upon said screen.

10. An apparatus as set forth in claim 3 wherein beam translating means is incorporated in said energy beam scanning means for traversing said beam in a pattern across said image.

11. An apparatus as set forth in claim 3 wherein adjustable diaphragm means is disposed in front of said energy beam scanning means for controlling its aperture opening.

References Cited

UNITED STATES PATENTS

| | | |
|---|---|---|
| 2,494,441 | 1/1950 | Hillier. |
| 2,875,666 | 3/1959 | Parker et al. |
| 2,964,639 | 12/1960 | Hobrough. |
| 3,009,388 | 11/1961 | Polanyi. |
| 3,148,244 | 9/1964 | Stamps. |
| 3,202,042 | 8/1965 | Jamieson et al. |
| 3,307,392 | 3/1967 | Owen et al. |
| 3,315,229 | 4/1967 | Smithline. |
| 3,368,872 | 2/1968 | Natelson. |
| 3,413,464 | 11/1968 | Kamentsky. |
| 3,458,287 | 7/1969 | Gross et al. |

RONALD L. WIBERT, Primary Examiner

W. A. SKLAR, Assistant Examiner

U.S. Cl. X.R.

250—218; 356—72, 196, 203